(12) United States Patent
Sidorovich et al.

(10) Patent No.: US 7,079,774 B2
(45) Date of Patent: Jul. 18, 2006

(54) FREE-SPACE OPTICAL COMMUNICATION SYSTEM

(75) Inventors: Vladimir G. Sidorovich, Moscow (RU); Aleksei A. Leshev, St. Petersburg (RU); Valery V. Ragulsky, Moscow (RU)

(73) Assignee: Meklyn Enterprises Limited, Larnaca (CY)

(*) Notice: Subject to any disclaimer, the term of this patent is extended or adjusted under 35 U.S.C. 154(b) by 805 days.

(21) Appl. No.: 09/983,227

(22) Filed: Oct. 23, 2001

(65) Prior Publication Data

US 2003/0035182 A1    Feb. 20, 2003

(30) Foreign Application Priority Data

Aug. 16, 2001    (RU)    ............... 2001122893

(51) Int. Cl.
*H04B 10/00*    (2006.01)

(52) U.S. Cl. ....................... 398/129; 398/131

(58) Field of Classification Search ........ 398/128–131, 398/122

See application file for complete search history.

(56) References Cited

U.S. PATENT DOCUMENTS

| | | | |
|---|---|---|---|
| 3,713,163 A | | 1/1973 | Keller et al. |
| 4,731,879 A | * | 3/1988 | Sepp et al. ................. 398/170 |
| 4,960,315 A | | 10/1990 | Kostal et al. |
| 5,047,776 A | * | 9/1991 | Baller ........................ 342/52 |
| 5,062,150 A | | 10/1991 | Swanson et al. |
| 5,887,090 A | * | 3/1999 | Rudolph et al. ............... 385/24 |
| 5,909,296 A | | 6/1999 | Tsacoyeanes |
| 6,031,648 A | * | 2/2000 | Javitt et al. ..................... 398/32 |
| 6,091,528 A | * | 7/2000 | Kanda ........................ 398/122 |
| 6,347,001 B1 | * | 2/2002 | Arnold et al. ............... 398/122 |
| 6,366,723 B1 | | 4/2002 | Medved et al. |
| 6,650,451 B1 | * | 11/2003 | Byers et al. ................. 398/129 |
| 6,795,655 B1 | * | 9/2004 | Sidorovich et al. ......... 398/128 |
| 2002/0171896 A1 | * | 11/2002 | Clark et al. .................. 359/172 |

FOREIGN PATENT DOCUMENTS

| | | |
|---|---|---|
| GB | 2180116 A | 3/1987 |
| WO | WO 00/48338 | 8/2000 |

OTHER PUBLICATIONS

"Physics, Part II" by Halliday et al., John Wiley & Sons, 1962, pp. 1055-1061.*
"Optics", 3rd Edition, by E. Hecht, Addison Wesley Longman, 1998, pp. 459-463.*
"Possible Optical Parameters of Objectives" (Russian Publication with English Translation), pp. 295-297.
Vladimir Sidorovich et al., "Mitigation of aberration in a beam shaping telescope and optical inhomogeinity in a free-space optical path using an extended light source coupled to the telescope", Proceedings of SPIE, vol. 4635, 2002, pp. 179-191.

* cited by examiner

*Primary Examiner*—Jason Chan
*Assistant Examiner*—Shi K. Li

(57) ABSTRACT

A free-space optical communication system serves transmit/receive subscriber terminals. Each subscriber terminal includes a photo-detector and one or more sources of modulated radiation. A base terminal comprises sources of modulated optical radiation intended for the subscriber terminals and a receiving system for receiving modulated radiation from the subscriber terminals. At the base terminal, and preferably at each subscriber terminal, each source has an associated beam shaping device. The receiving system includes photo-detectors and a shared wide-angle objective implemented as a single lens. Within the base terminal, the objective lens is optically coupled only to the photo-detectors of the receiving system, and the beam shaping devices at that terminal do not have common optical elements with the lens or with each other. The preferred embodiment provides automatic stabilization in relation to local vertical direction and uses multimode fibers having specific parameters to supply radiation from the sources to the beam shaping devices.

30 Claims, 9 Drawing Sheets

FREE-SPACE OPTICAL COMMUNICATION SYSTEM

FIELD OF THE INVENTION

The inventive concepts relate to free-space optical communication systems for two-way information transfer between remotely located objects without wires and/or optical fibers, including applications in which many objects take part in the information exchange, e.g. in point-to-multipoint two-way information exchange between a base terminal and a plurality of subscriber terminals.

BACKGROUND

The key components of a base terminal for free-space optical point-to-multipoint communications are transmitters emitting in several given directions separate optical beams modulated, in a general case, by different transmit signals, and receivers, based on photo-detectors and used for separate reception of optical signals coming from different directions. In case of multiple subscribers to be serviced from one hub, point-to-multipoint free-space optical communication systems provide considerable advantage over use of a "multi-channel principle", i.e. deployment of multiple similar-type channels operating point-to-point.

The use of a "multi-channel design" in a free-space optical communication system increases its mass, size, and cost approximately N-fold where N is the number of directions (of separate optical beams) needed to provide communications for N subscribers with one hub, because everyone of the similar-type channels comprises all components and subsystems needed for operation, including the ones which in point-to-multipoint systems are represented by a shared single unit supporting operation of all channels.

A free-space optical communication system is known (see the description of the Great Britain Patent No. 2,180,116). The system is implemented as a plurality of photo-detectors and a plurality of radiation sources placed on a curved surface, e.g. on a hemisphere. The system has the following drawbacks: complicated alignment of sources relative to every corresponding receiver; limited application because of distance limitation caused by large beam divergences which, in turn, causes large beam spread losses. To increase the distance of communication it is necessary to reduce a receive signal bandwidth, because the lower photo-detector input signal supports the narrower bandwidth allowed for reliable operation of the channel.

A free-space optical communication system is known from the description of the U.S. Pat. No. 5,909,296. The system comprises light sources with light beam modulation means, and one or more optical receivers with demodulation means. To reduce the beams divergence, each of the sources is provided with a micro-lens. The sources are immovable relative to the lenses, thus precluding alignment of the beam width and/or direction in case of a change in distance and/or angle between the receive and transmit terminals. Therefore, despite of a beam-width reduction due to use of the lenses, the system efficiency is low.

From the description of the U.S. Pat. No. 3,713,163, a system is known for communication with a plurality of moving objects. The system comprises radiation sources and receivers placed in the paraxial area at the focal surface of a single focussing device, e.g. a parabolic reflector or a lens. Several sources and receivers are implemented so that they can be rotated around the focussing device axis, providing their coupling with a selected object. A drawback of this system is the use of a shared focussing device with narrow field of view, thus limiting the solid angle wherein the plurality of objects can be located, by the paraxial area.

A more recent technical development in a free-space optical communication system is described in 00/48338. The system proposed in WO 00/48338, if implemented for two-way communications, comprises a plurality of radiation sources and a plurality of photo-detectors placed in the focal surface of a shared wide field of view lens system of the transmit/receive base terminal, as well as sources and photo-detectors installed on several remote subscriber terminals. In accordance with the description in WO 00/48338, at the transmit/receive base terminal the transmit and receive optical beams are passing through the same shared lens system. This lens system is used as a common optical antenna providing concentration on the base terminal photo-detectors of light beams intended for those detectors. The common lens system also serves as a collimating device reducing the divergence of light emitted by the sources and output as light beams targeted at the distant subscriber terminals. This communication system has the following drawbacks.

Firstly, the use of a common multi-component lens system in the transmit and receive base terminal optical paths requires spatial superposition (or, at least, optical matching) of the source and photo-detector providing two-way communication to and from the corresponding subscriber terminal. Both the source and photo-detector must be spatially, or optically, combined in the same area of a lens system focal surface corresponding to a particular subscriber terminal related to the source and the photo-detector.

To provide such spatial superposition of the source and photo-detector within the lens system focal area allocated for a particular subscriber, these elements must be of a size several times less than the lens system's point spread function's transverse size, which in general is difficult to achieve and may be prohibitively expensive. The description suggests use of optical superposition, where the specular reflections of the source and of the photo-detector are spatially superimposed by means of a beamsplitter, however, that approach requires additional expenses. At high density of components (sources and photo-detectors) in the focal surface of the shared lens system the beamsplitters would need to be so compact that it may be technically nonrealistic to implement such a design.

Another disadvantage is that the shared lens system used both as an optical antenna (in a receiving mode of operation) and as a collimating device (in a transmitting mode of operation) significantly reduces flexibility in employing efficient technologies for individual shaping and attenuation/amplification of the base terminal output optical beams to adjust the beams' divergence, average size of their transverse intensity distribution non uniformity, and output power to a particular operating distance, optical power losses in a free-space optical path and a subscriber terminal aperture size. The shared lens system also complicates the individual targeting of the base terminal output optical beams, including directing several output beams carrying the same information stream at one receive aperture of a subscriber terminal intended for that information.

Furthermore, to achieve wide field of view of the shared lens system proposed in the known communication system it is implemented consisting of at least two lenses,—a wide-angle lens and a second "focussing" lens (the term used by the authors of WO 00/48338). A common drawback of such multi-component lens systems is that the input optical aperture (pupil) is considerably smaller than the first lens diameter. As a result, to achieve a pupil diameter of 50–150 mm needed for many practical applications, it may be necessary to use a first lens having a diameter significantly larger than this value. Lens systems having diameters comparable or larger than 200–300 mm are expensive, and their use may require impractical weight and size in the base terminal.

The above conclusion regarding the weight and size of the base terminal is based on the following considerations. The wide-angle objective lenses may be typically characterized by the relation D'/F=1, where D' is the objective lens diameter and F is its focal distance. Second, it is known that for multiple-lens systems $$\frac{d'}{F} = \frac{C}{tg(\gamma/2) \cdot \sqrt{F/100 \text{ mm}}}$$

where d is the pupil diameter, γ is the angular field of view, and the C parameter for different systems lies within 0.22÷0.24 (see д. С.Волосов.. Фотографическаяоптика. М., "Искусство", 1978, с. 296). It follows from the above:

$$\frac{D'}{d'} > \frac{tg(\gamma/2) \cdot \sqrt{F/100 \text{ mm}}}{C}$$

At γ=120° and F=150 mm the formula gives D'/d'>10.

Thus, in the wide-angle multi-component lens system the diameter of at least one lens may be an order of magnitude larger than the pupil diameter, causing corresponding increases in the terminal size and weight. Such an increase may be impractical if an attempt is made to achieve d' values of 50/150 mm necessary for some practical applications in free-space optical communication.

SUMMARY

Hence, an objective is to increase the communication range, bit rate and reliability as well as to reduce the weight, size and cost of the free-space optical communication system, preferably without excess complexity or cost.

To achieve the above result, the free-space optical communication system comprises a plurality of transmit/receive subscriber terminals with optical radiation sources, modulators and photo-detectors, as well as a base terminal. The base terminal includes a plurality of sources with modulators and a receiving device. The receiving device of the base terminal includes a plurality of photo-detectors and a shared wide-angle objective. The objective is implemented as a single lens and is optically coupled only to the photo-detectors. The base terminal radiation sources are provided with individual optical beam shaping devices, which share no common optical elements with the receiving device single lens objective and with the beam shaping devices of other radiation sources at the base terminal.

In the preferred embodiment, the receiving device single lens wide-angle objective is implemented as a ball lens with an index of refraction n meeting the condition 1<n≦2. The receiving device single lens objective may be implemented as a set of concentric spherical layers made of optical materials with different indices of refraction so that the spherical focal surface of the lens has a radius of curvature $$R_f \geq R_o$$

where $R_f$ is the radius of curvature of the lens focal surface, and $R_o$ is the radius of curvature of the lens external surface.

Preferably, the optical beam shaping device associated with each radiation source in the base terminal comprises at least one focussing element. Also to achieve the above result, the optical beam shaping device for example may be implemented as a telescope. In one actual embodiment, the optical beam shaping device focussing elements and the corresponding source are implemented so that they can be moved relative to each other.

The preferred beam shaping device comprises at least two optical wedges, made of an optical material transparent for this beam, which are placed in the beam propagation path so that each of them can be rotated around the beam axis. This beam shaping device is provided with an optical filter and/or an optical attenuator placed in the beam propagation path and implemented so that a stepwise or smooth variation of their transparency is possible, and/or optical fiber delivering the optical radiation from the source to the device. In the preferred embodiment the optical fiber is a multimode fiber selected to meet criteria providing for efficient transportation of optical radiation to subscriber terminals through free-space optical path.

In the preferred system, the radiation sources at the subscriber terminals are equipped with individual beam shaping devices having the same design as beam shaping devices at the base terminal. The devices in the subscriber terminals may be provided with optional additional components similar to those of the base terminals' beam shaping devices', such as optical filters and/or attenuators and/or optical wedges, and/or optical fibers delivering the optical radiation from the sources to the beam shaping devices. In such a case, the optical fibers in the subscriber terminals are multimode fibers selected to have characteristics satisfying similar criteria.

The inventive use of a particular optical fiber, to couple the source to the beam shaping device, aims for mitigation of the effects of beam shaping device's aberrations and various optical non-uniformities of a free-space optical path that otherwise impact the free-space transmission. This concept may be used in the base terminal or in one or more subscriber terminals, or both. Also, this technique has applications to other free-space optical communication systems, for example using somewhat different optics and/or in point-to-point type free-space optical communications systems.

In any of these applications, at least one radiation source is provided with a multimode optical fiber with properly selected parameters delivering the optical radiation from the source to the beam shaping device. The fiber is selected from among multimode fibers with a core diameter d and numerical aperture NA satisfying the following expressions:

$$d > f \cdot P/L, \text{ and } NA > \lambda \cdot L/(D \cdot f),$$

where:
  f—is a focal length of the beam shaping device;
  P—is a transverse size of light distribution pattern created in the receive aperture plane of the remote terminal (subscriber or base) by a light emitting point located within a cross-section of the fiber output end coupled to the beam shaping device;
  L—is a distance from the beam shaping device output lens to the receive aperture of the remote terminal (subscriber or base);

The remote terminal receive aperture plane—is a plane perpendicular to a line connecting a center of the beam shaping device output lens and a center of a receive aperture of the remote terminal (subscriber or base), with a center of the receive aperture the remote terminal (subscriber or base) being located in this plane;

The receive aperture the remote terminal (subscriber or base)—is an aperture of an optical system concentrating optical radiation of the beam emitted by the beam shaping device at the remote terminal photo-detector;

λ—is a wavelength of the optical radiation output from the fiber;

D—is a diameter of the receive aperture (pupil) at the remote terminal (base or subscriber).

Also, at least one photo-detector may be provided with an optical fiber through which the radiation collected by the objective lens is delivered to the photo-detector, again, in either the base terminal or one or more of the subscriber terminals. Optical amplifiers may be installed between the base and/or subscriber terminal radiation sources and optically coupled to subscriber and/or base terminal photo-detectors. At least one optical amplifier may be implemented as an active fiber (fiberoptic amplifier).

Another object relates to stabilizing the base terminal in alignment with the remote subscriber terminals. To that end, an embodiment of the base terminal is provided with a local vertical direction sensor. The sensor is used to produce a control signal to drive a device for stabilizing the optical field of view of the receiving device and the field of view of at least one beam shaping device relative to this direction. In many cases this automatic vertical stabilization is quite effective to compensate for various tilting movements of the building that supports the base terminal.

As another preferred feature, at least one subscriber terminal is provided with a local vertical direction sensor and a device for automatically stabilizing the field of view of the optical system concentrating optical radiation at the terminal's photo-detector and the field of view of at least one beam shaping device relative to this direction.

Another object relates to finding an effective technique to align elements of the base terminal with those in a distant subscriber terminal. As part of such a technique, a base terminal receiving device is provided with a sensor of angular misalignment between the base terminal receiving device line-of-sight direction at the subscriber terminal beam shaping device and a center of the receiving device instantaneous field of view corresponding to the base terminal photo-detector intended for reception of an optical beam emitted by respective subscriber terminal beam shaping device. Base terminal beam shaping devices may be provided with sensors of angular misalignment between line-of-sight directions at the optical systems concentrating the beams' radiation at the subscriber terminals photo-detectors for which the beams are intended, and the beam shaping devices axes.

At least one subscriber terminal is set-up using a sensor of angular misalignment between the line-of-sight direction at the base terminal beam shaping device pointed at this subscriber terminal, and the center of corresponding to photo-detector field of view of the optical system concentrating the beam's radiation at the subscriber terminal photo-detector. The beam shaping device of the subscriber terminal is provided with a sensor of angular misalignment between a line-of-sight direction at the base terminal receiving device and this beam shaping device axis.

Preferably, the angular misalignment sensor is implemented as a beamsplitter installed in the path of the light propagation from the base or subscriber terminal sources to the corresponding subscriber or base terminal photo-detectors. While in the path of the optical beam reflected from the beamsplitter, to one side, a retroreflector is installed, and, to the other side, a focussing device is installed having in its focal area a sensor of light intensity spatial distribution. In operation, the sensor produces two images. One image is that of the local (where the misalignment sensor is installed) transducer (e.g. the photo-detector or the source (laser or output cross-section of an optical fiber delivering laser radiation to the beam shaping device)). The other image is that of the transmit or receive aperture of the remote system. The two images detected by the sensor of light intensity distribution are shown on a monitor, and transmit/receive optical system components positions are adjusted until the two images substantially coincide.

Additional objects, advantages and novel features will be set forth in part in the description which follows, and in part will become apparent to those skilled in the art upon examination of the following and the accompanying drawings or may be learned by practice of the inventions. The objects and advantages of the inventions may be realized and attained by means of the instrumentalities and combinations particularly pointed out in the appended claims.

BRIEF DESCRIPTION OF THE DRAWINGS

The drawing FIGS. depict preferred embodiments by way of example, not by way of limitations. In the FIGS., like reference numerals refer to the same or similar elements.

DETAILED DESCRIPTION OF THE PREFERRED EMBODIMENTS

Reference now is made in detail to the presently preferred embodiments, examples of which are illustrated in the accompanying drawings and discussed below.

Figure 1A:
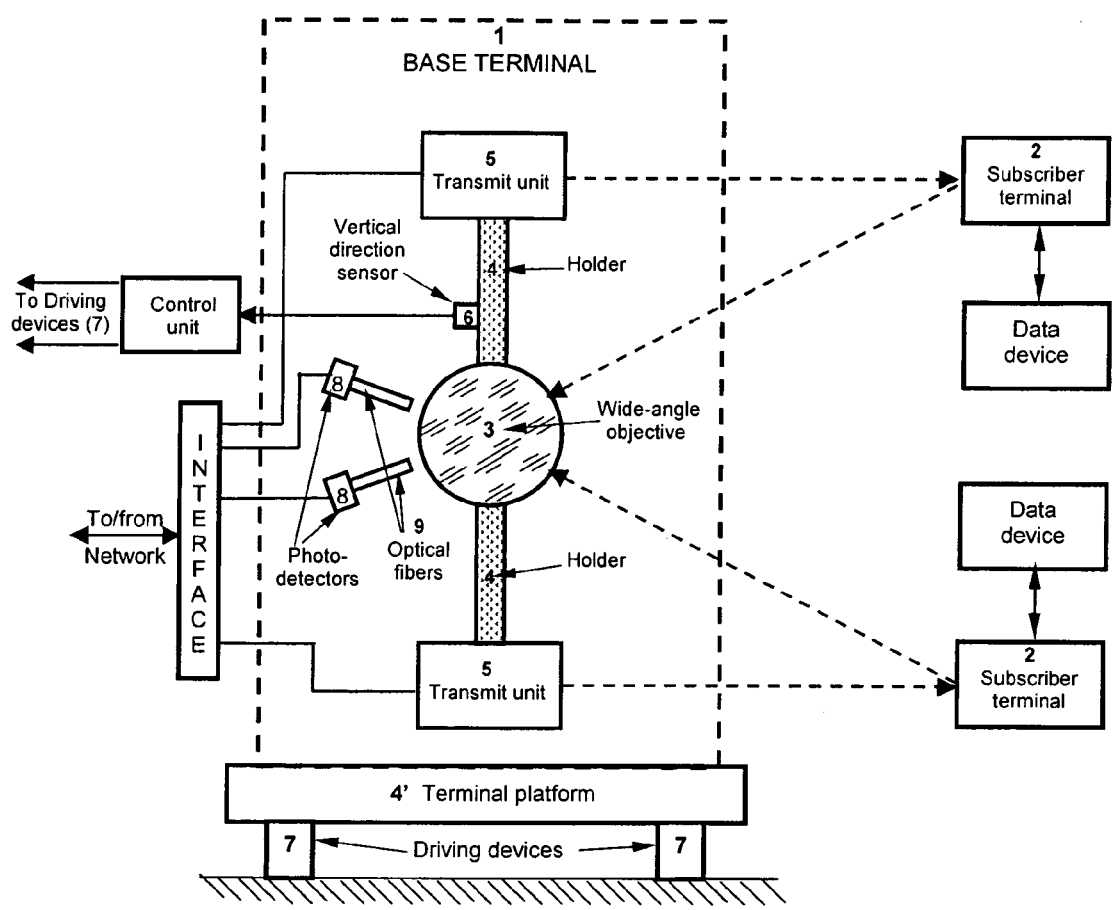
FIG. 1A is a side view of an embodiment of a base terminal and two remote subscriber terminals in a free-space optical communication system located on one side of the hub base terminal.
Figure 1B:
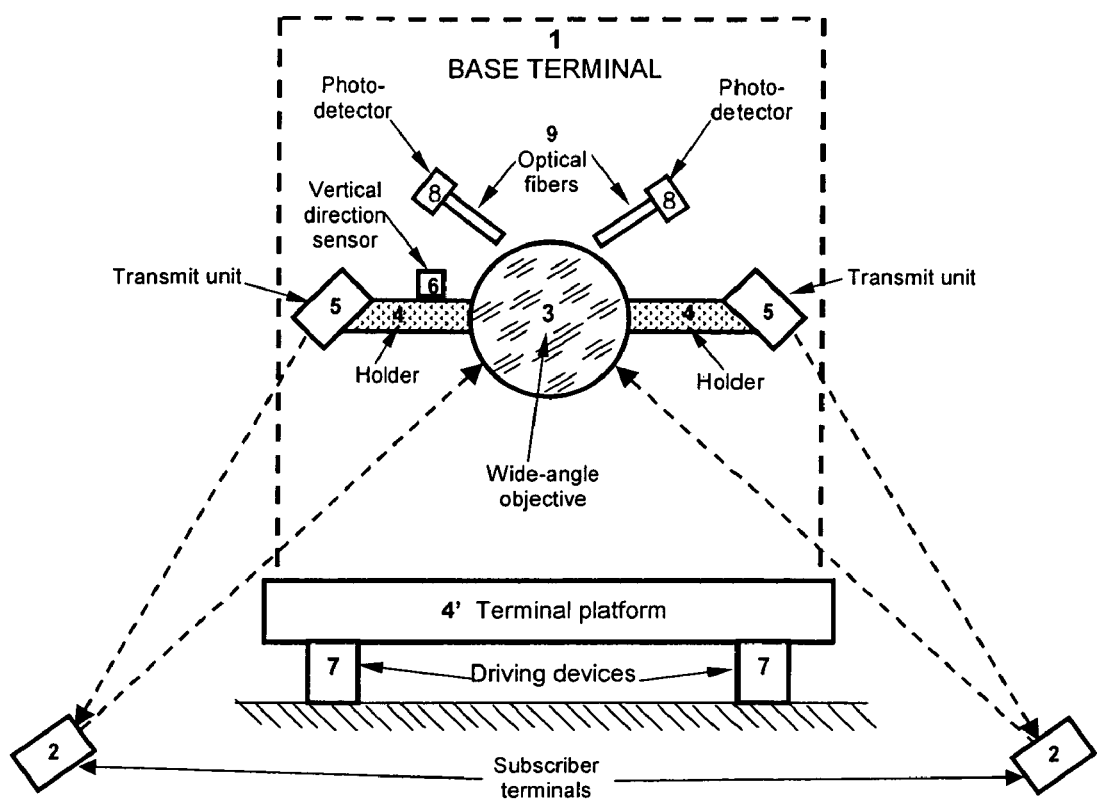
FIG. 1B is a view of a system similar to that of FIG. 1A but with the remote stations at locations surrounding the base terminal.

The major elements of an embodiment of a free-space optical communication system are illustrated by an example FIGS. 1A and 1B. Those drawings provide general views of the system, with two slightly different configurations of the base terminal 1 to communicate with remote terminals 2 shown in different locations about the base terminal 1.

The free-space communication system shown in FIGS. 1A and 1B comprises a transmit/receive base terminal 1 connected to a telecommunication network through an interface (for example, through ATM switch or other known networking equipment) and a plurality of transmit/receive subscriber terminals 2 connected to customer premises equipment (shown as "Data Device" in FIG. 1A). The base terminal 1 comprises a wide-angle objective 3 implemented as a single lens used as an optical antenna. In certain cases, the single lens wide-angle objective 3 may be implemented as a homogeneous ball made of a transparent material, although a preferred multi-layer ball lens is discussed later with regard to FIG. 2.

The lens 3 is fastened in a holder 4. The holder 4 in turn is rigidly fastened on the terminal platform 4'. Several transmit units 5 are installed on the holder 4 (or fastened on the terminal platform 4'). Each of the transmit units 5 either comprises a source of modulated radiation carrying information or is connected to such source through an optical fiber. The interface drives each source so as to produce optical radiation modulated with information intended for one of the subscriber terminals. Also each unit 5 comprises e an optical beam shaping device optimally forming a beam for most efficient delivery of radiation to a receive aperture of the remote subscriber terminal. The source (or an interface through which the optical fiber is optically coupled to the beam shaping device) and the beam shaping device are preferably combined in a common housing.

Photo-detectors 8, for receiving modulated optical radiation from remote subscriber terminals and supplying corresponding electrical signals to demodulation circuits in the electrical interface, are optically coupled to the objective lens 3. Such optical coupling, in certain cases, may be implemented via multimode optical fibers 9, which deliver the optical radiation collected by the objective lens 3 to the individual photo-detectors 8. In particular cases, the fibers may be active ones (fiberoptic amplifiers).

Embodiment of the base terminal so that the wide-angle objective is implemented as a single lens 3 and is optically coupled only to the photo-detectors, while the radiation sources are provided with individual optical beam shaping devices, allows for:

(a) A substantial reduction of mass, size and cost of the base terminal having particular receive aperture (pupil) diameter. For example, if the objective comprises only a single ball lens, a 50-mm pupil diameter is achieved with the lens diameter of about 100 mm.

(b) A simplification of the base terminal's elements alignment and easement of the output beams shaping and controlling their parameters for establishment of a cost efficient two-way communication with multiple subscriber terminals.

In case of a compact wide-angle objective lens, a focal area is correspondingly small, making precise placement of both photo-detectors and radiation sources in the objective's focal area a hard task. Easement of the radiation sources installation and alignment problem is achieved as the objective lens performs only one function—it serves as an optical antenna, while each of the sources is pointed at the corresponding subscriber terminal by means of an individual beam shaping device, independent of similar devices of the other sources.

Provisioning of a base terminal radiation source with an individual optical beam shaping device inside the unit 5 having no common optical elements with the receiving device objective lens and with the optical beam shaping devices of other base terminal sources allows installation the source so as to optimize the system design as a whole, rather than place the source very close to a particular base terminal photo-detector, which is imperative in the prior art.

In both illustrated implementations (FIGS. 1A and 1B) the objective is a single lens 3, which is optically coupled only to the photo-detectors. The base terminal radiation sources inserted in units 5, or optically connected to such units via optical fibers, have individual optical beam shaping devices, which have no common optical components with the receiving device objective lens 3 or with the others of those beam shaping devices.

Separation of the beam shaping device optical path from other optical systems of the base terminal also makes it possible to introduce any required changes into the beam shaping path without infringement of the base terminal receiving device optical path or optical paths of the beam shaping devices of other beams. In particular, it is possible to implement a beam shaping optical path allowing a displacement of its elements relative to each other, as well as introduction of various complementary optical elements providing an optimum solution of problems specific for a given path (adjustment of the beam divergence to the operating distance and alignment of a direction of the beam shaping device output at the intended receive aperture, randomization of the beam's angular spectrum using a multimode optical fiber installed between the radiation source and an output telescope of the beam shaping device, as well as amplification or attenuation of the beam power, etc.).

In particular cases of implementation, the use of a single ball lens as a receiving device objective provides a capability to receive signals from subscribers located within a very wide angular field of view (up to ±60° in vertical, elevation, and horizontal, azimuth, planes), which is limited not by the lens itself (the ball lens, due to its central symmetry, is in principle capable to encompass a field of view up to 360° on azimuth and elevation) but by vignetting of the light rays by the base terminal structure elements. The base terminal configurations also may be implemented to provide service of the subscribers located around the terminal within 360° degrees azimuth angle (elevation angles are limited in this case within the range of ±40°–45° by the design of the holder, platform and other systems of the terminal).

The calculations and experiments made by the authors of the present application show that the pupil of a spherical optical antenna made of a homogeneous material may be as large as 40% to 50% of the ball lens diameter. The authors of this application also have experimentally implemented the receiving devices with objective lenses having d'/F values up to 0.75.

As an example, in a point-to-multipoint system implemented by the authors of this application, a ball lens made of homogeneous material was used as an objective lens. The ball with the diameter of 128 mm was made of a heavy flint glass TΦ-5, and its pupil diameter was about 55 mm, providing reliable communications with a plurality of subscriber terminals located at distances up to 800–1000 m. The subscriber terminals could be located within ±60° field of view in vertical and horizontal planes, the field of view being limited only by its shadowing by the ball lens holder.

It should also be noted that the pupil size of a ball-lens objective (optical antenna) 3 does not depend on the input light rays direction, thus making the system easier to operate, as a potential of such antenna is uniform for the subscribers located at different directions.

In one embodiment, the receiving device objective lens is a ball lens with an index of refraction n meeting the condition $1 < n \leq 2$. Using a ball lens made of a homogeneous optical material with an index of refraction meeting the condition $1 < n \leq 2$ provides positioning a focal surface outside the ball lens, thus allowing to arrange the photo-detectors in the areas of optimum focussing of the optical radiation emitted by corresponding subscriber terminals.

The location of these areas, while depending on the distance to a particular subscriber terminal, is nevertheless close to the focal surface. In a particular communication system implemented by the authors of this application, the focal surface is ~8 mm apart from the ball lens surface, allowing arrangement of the photo-detectors, or entry cross-sections of optical fibers delivering radiation to the photo-detectors, at a distance sufficient for their convenient adjustment.

The implementation of the ball lens as a set of concentric spherical layers makes it possible, by proper selection of refraction index and thickness of each layer, to place the lens focal surface at a given distance from the lens, thus simplifying the design of devices located in the vicinity of the focal surface (for example, of the photo-detector holders). Besides this, a proper selection of the thickness and refraction index of each layer allows to achieve an increase of the lens effective pupil size relative to a ball lens with the same diameter made of a homogeneous material. The pupil diameter may be achieved in this case close to the lens physical diameter. In any case, the condition $R_f \geq R_o$ should be met to provide location of the focal surface outside the lens.

Figure 2:
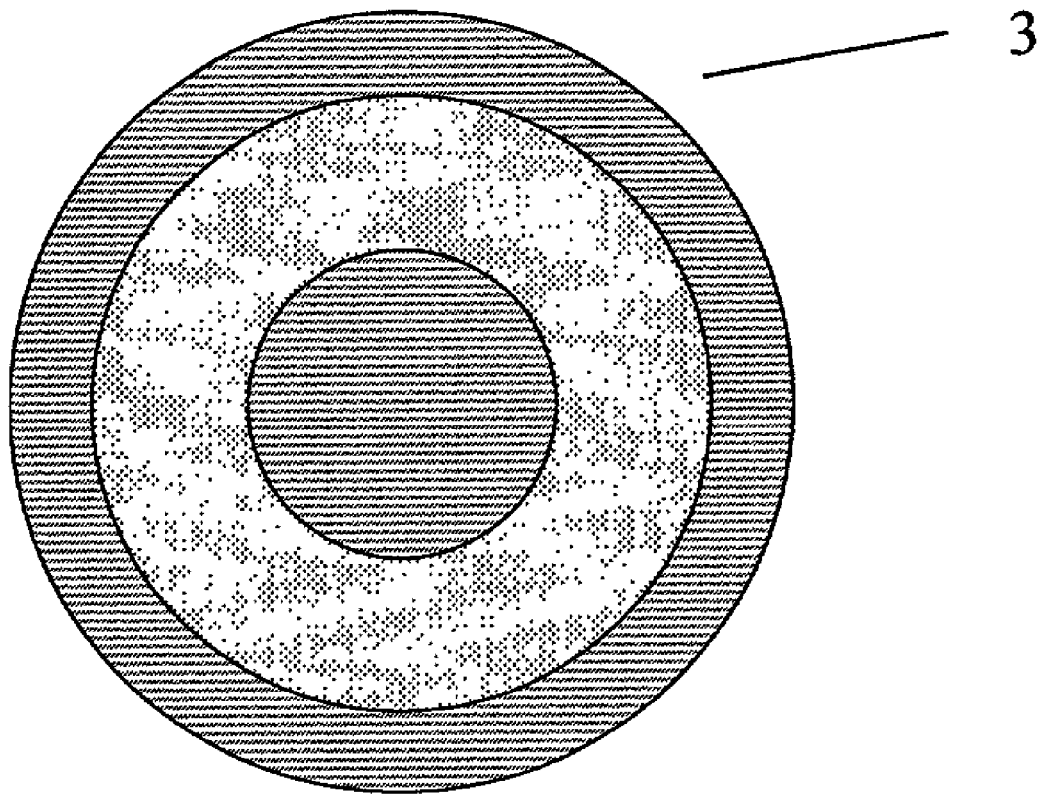
FIG. 2 is a cross-sectional view of a multilayer ball type embodiment of the wide-angle objective.

FIG. 2 provides a cross-section view of the single lens wide-angle objective 3 in the base terminal 1, for one exemplary implementation. In that implementation, the lens 3 consists of a core and concentric spherical layers. The set of concentric spherical layers made of optical materials with different indices of refraction so that the spherical focal surface of the lens has a radius of curvature $$R_f \geq R_o$$

where $R_f$ is the radius of curvature of the lens focal surface, and $R_o$ is the radius of curvature of the lens external surface.

The difference between the embodiments shown in FIGS. 1A and 1B is the following. Embodiment 1A is most suitable for servicing multiple customers concentrated on one side of a hub. The field of view of the base terminal receive devices in this embodiment covers ±45°–60° in vertical and horizontal planes, when directed toward a group of the subscribers. The transmit units 5 in this embodiment are located around objective lens 3 of the receive devices, in a vertical plane or close to such plane.

However, in an application where multiple subscribers surround a hub on all sides, it would be necessary to install at least three base terminals implemented as exhibited in FIG. 1A to provide a 360° azimuth coverage. A more efficient approach to such a situation is a configuration as presented in FIG. 1B, where the transmit units 5 are located around the receive device's lens 3 in a horizontal plane. In this embodiment, the receive device's field of view is not screened by the transmit units and covers 360° in horizontal plane. This arrangement allows targeting of the receive device's photo-receivers in substantially any azimuth direction. Also positioning of the units 5 in a horizontal plane around the receive device lens prevents output apertures of the beam shaping devices from being screened by the wide-angle objective lens 3 or by its holder 4 or by the platform 4' and provides targeting of output beams in any azimuth direction.

Any combination of configurations shown in FIGS. 1A and 1B is possible. For example, in configuration 1B several additional transmit units may be installed in a vertical plane facing a group of subscribers located close to each other around a given azimuth direction from a hub. Other transmit units may placed in a horizontal plane around the receive system objective lens to service other subscribers with locations spread over 360° around a hub in azimuth directions.

Obviously, the number of subscribers serviced with one base terminal is limited by the base terminal design that shall be convenient in maintenance and operation. Experiments performed by the present authors demonstrate that it is not practical to make this number higher than 15–20. If the number of subscribers to be serviced from one hub exceeds 20, it is advisable to install more than one base terminal 1 on such hub.

In accord with one feature, the holder 4 is directly or by means of interim elements connected to a local vertical direction sensor 6, of a known type. For example, the sensor 6 may be an electrically conducting pendulum freely oscillating in a conducting liquid within a housing with electrical contacts attached to its sides. Processing of signals passing between the pendulum and the contacts, through the liquid in different directions, allows determination of deviations of the attached holder or other structure from vertical, in two orthogonal dimensions. The sensor 6 is connected to a processing its signals control unit of the base terminal stabilizing device (not shown), of a known type.

Buildings' deformation can cause misalignment between supported by the buildings optical systems installed on opposite sides of a free-space optical communication link. To compensate for a supporting building instability, the terminal 1 includes electrically actuated mechanical driving devices 7, rigidly attached to the platform 4', for providing an angular displacement of the platform 4' relative to a base supporting the terminal (for example, relative to a metal structure rigidly connected to a building construction). Control signals generated by the control unit in response to the sensor signal, essentially corresponding to deviations of the holder 4 in relation to the local vertical direction, are used to control the driving devices 7 to adjust the tilt angle of the platform 4' in two orthogonal directions. In this manner, the system automatically compensates for deviations of the system orientation due to tilting movements of the building in which the system is mounted, for example due to unequal heat expansion/contraction and/or due to wind induced sway.

Figure 6:
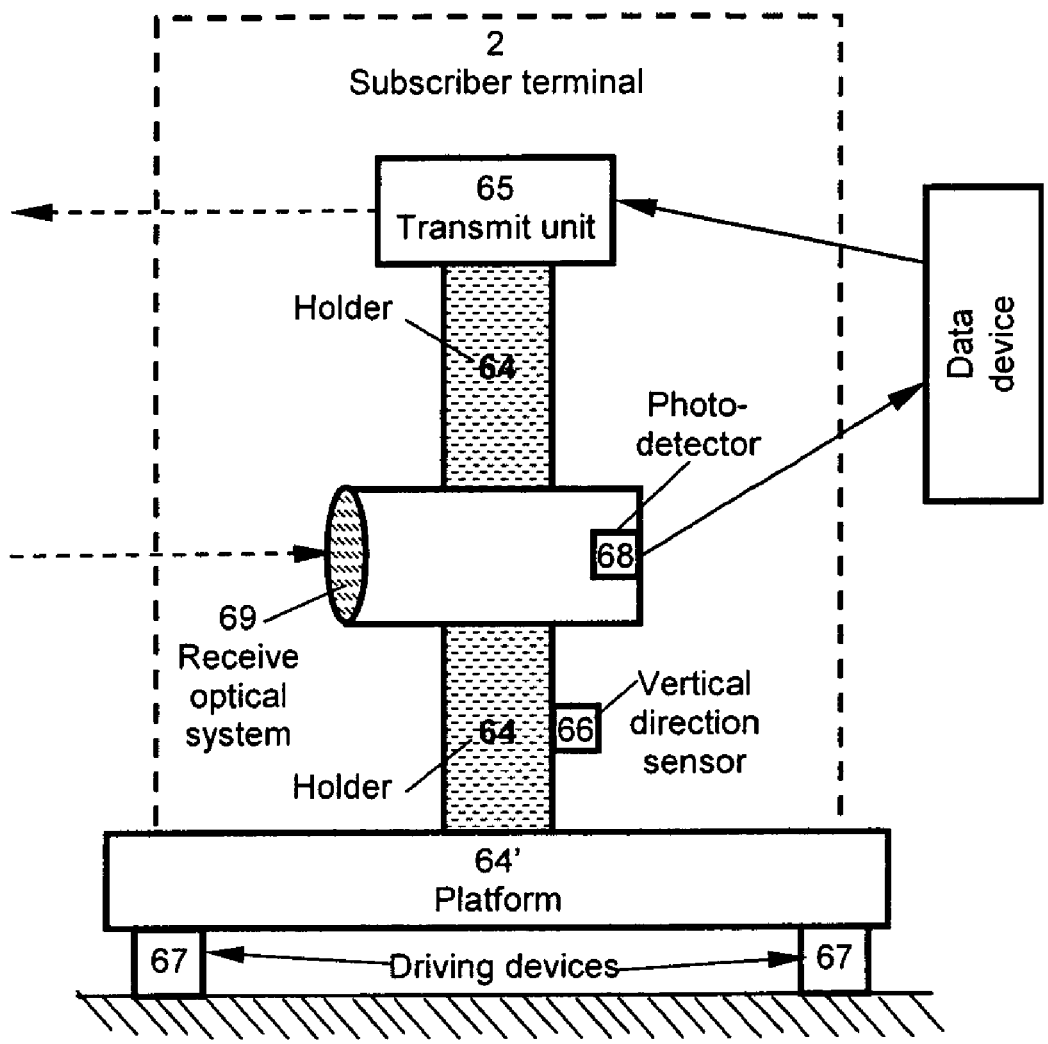
FIG. 6 is a side view of an embodiment of a subscriber terminal.

The subscriber terminals 2 (see FIG. 6), like the base terminal, may be provided with similar vertical direction sensors 66, platform 64', driving devices 67, optical beam shaping devices installed in the transmit units 65, angular misalignment sensors, etc., although not separately shown in the drawing. Such devices at the subscriber terminals are similar in design to the ones used in the base terminal. Also, the subscriber terminals 2 have receive optical systems 69 for concentrating the radiation received from the base terminal 1 at their photo-detectors 68, which may be any appropriate known optical telescope or other kind of optical antenna.

Figure 3:
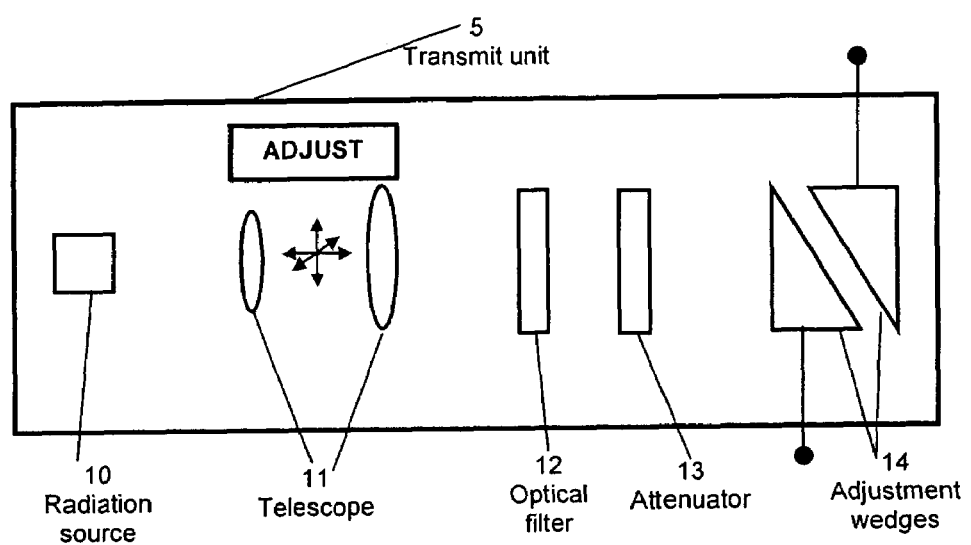
FIG. 3 is a simplified schematic drawing of a beam shaping device.

FIG. 3 depicts a schematic of a preferred option of the optical beam shaping device, which may be used in either the base terminal 1 or one of the subscriber terminal 2. For discussion purposes, assume that this implementation is utilized as one of the transmit units 5 of the base terminal 1.

In the unit 5, an optical radiation source 10 is installed. The source 10 is shown as a laser diode or the like, for convenience here, although as described later, a preferred embodiment uses a remote source and a properly selected mulitmode optical fiber to deliver the modulated radiant energy to a location at or about the location of element 10 in the unit 5. In the case of a remote source, the element 10 is implemented as an interface or mount where the optical fiber may be plugged with its output cross-section located properly relative to the beam shaping device focal surface.

The unit 5 also includes an optical beam shaping device, which generally is implemented as at least one focussing element and, in a preferable embodiment, as a telescope 11 or a similar system shaping the beam's angular directivity diagram. In certain cases, it is desirable to further include into the beam shaping device an optical filter 12, an attenuator 13, and a pair of optical adjustment wedges 14.

Lenses are installed into the telescope 11 in a way providing for their movement along all three coordinates relative to the radiation source (or the optical fiber cross-section) 10 and relative to each other (also the source can be moved relative to the lenses). Such movement may be performed manually or by electric drives via mechanical adjustment systems of a known type (shown in the figure as "Adjust"). The wedges 14 are installed so that they can be independently rotated around the axis of the optical beam to adjust the beam direction. In the system implemented by the authors of the present application each wedge is installed in a rotating mount and the rotation is performed manually via handles attached to the mounts.

The implementation of the optical beam shaping device as at least one focussing element allows for reduction of the beam divergence, and hence minimization of the beam spreading loss, which in turn increases the availability of communication links.

The implementation of the optical beam shaping device as a telescope and provision of a possibility to move its elements and the radiation source (or the optical fiber output cross-section) relative to each other allows to adjust the curvature of the output beam wavefront spherical component (by longitudinal displacement of the source relative to the beam shaping device objective lens) and hence the beam diameter at the corresponding subscriber terminal. Besides this, a possibility arises of precise beam pointing at the subscriber terminal by lateral displacement of the source relative to the beam shaping device output aperture.

The optical filter 12 and/or the optical attenuator 13 may be placed in the beam propagation path and implemented so that a stepwise or smooth variation of their transparency is possible. Use of the optical filter 12 in the unit 5 allows the radiation with the operation wavelength to pass without significant loss, while protecting the source against interference from other sources of optical radiation (e.g., the Sun occasionally coinciding with the beam shaping device optical axis, would shine into the source and its power control systems, disturbing their operation).

Use of the attenuator 13 placed in the beam propagation path within the unit 5 allows adjustment of the output power in accordance with the energy losses in the path between the base terminal and the subscriber terminals' photo-detectors. For example, the attenuator 13 may be used in situation in which it is desired to reduce the beam power, for example, for safety reasons. To understand this aspect, consider the case where the base terminal 1 is located indoors and radiates through the window panes introducing a loss of the beam power (~20% to 80% is a range of losses typically observed in different practical applications, depending on the glass thickness and its type, the glass coating, and an angle of the beam incidence on the window). The beam may be transmitted through the shaping device without the attenuation. However, if the base terminal 1 is installed outdoors, to maintain the same beam power level at the subscriber, as with the window, it may be advisable to attenuate the beam inside the beam shaping optical system. The output power generally should be limited by eye safety requirements as well as by the dynamic range of the photo-detector at which the beam is pointed.

As noted, the unit 5 (FIG. 3) also includes pair of optical adjustment wedges 14. Provisioning of the optical beam shaping device with at least two optical wedges made of a transparent material and placed in the beam propagation path, the two wedges being implemented with a capability of rotation around the axis of the beam, allows to provide pointing of the beam at the subscriber terminal. In particular, if there are two wedges, their rotation relative to each other acts like changing the angle of a combined wedge, and hence deflects the beam relative to device axis. A simultaneous rotation of the two wedges rotates the beam axis around the device axis. Using common or separate rotation of the wedges, it is possible to point the beam at the required subscriber terminal with high accuracy within an angle of $\pm 2\alpha(n-1)$, where $\alpha$ is the angle of each wedge (in case the angles are equal), and n is the refraction index of the wedges material.

Figure 4:
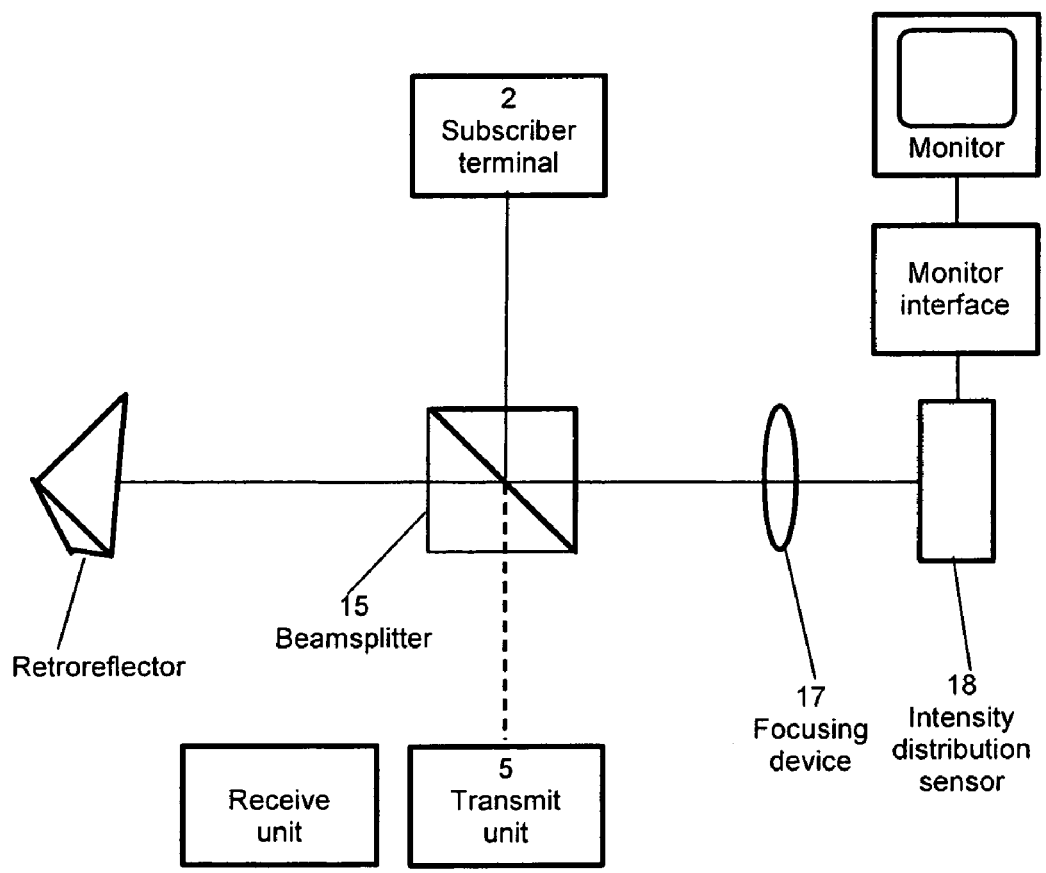
FIG. 4 is a schematic diagram of various elements of the angular misalignment sensor during an alignment operation.

Other features of the inventive system relate to use of one or more angular misalignment sensors to monitor alignment of elements of the base station and the remote terminals. FIG. 4 shows a configuration of the device for angular misalignment sensing and measurement inserted into one of the beam paths during an alignment operation. As discussed more below, the alignment technique is applicable to both the base terminal and the remote terminals and in both directions.

Hence, one alignment approach involves provisioning of the base terminal receiving device with a sensor of angular misalignment between a base terminal receiving device line-of-sight direction at the subscriber terminal beam shaping device and a center of the receiving device instantaneous field of view corresponding to the base terminal photo-detector intended for reception of an optical beam emitted by respective subscriber terminal beam shaping device. The alignment also involves provisioning one or more of the base terminal beam shaping devices with sensors of angular misalignment between line-of-sight directions at the subscriber terminals receive apertures and the beam shaping devices axes.

With regard to the subscriber terminal, alignment may entail provisioning of at least one subscriber terminal with a sensor of angular misalignment between the line-of-sight direction at the base terminal beam shaping device pointed at this subscriber terminal, and a center of corresponding to the subscriber terminal photo-detector instantaneous field-of-view of the optical system concentrating the beam's radiation at such photo-detector. Alignment may also involve provisioning of the beam shaping device of at least one subscriber terminal with a sensor of angular misalignment between a line-of-sight direction at the base terminal receiving device aperture and this beam shaping device axis.

The preferred implementation of the angular misalignment sensor comprises a beamsplitter installed in the path of the light propagation from the base or subscriber terminal sources to the corresponding photo-detectors, while in the paths of the optical beam reflected from the beamsplitter, to one side, a retroreflector is installed, and, to the other side, a focussing device is installed having in its focal area a sensor of light intensity spatial distribution. A specific implementation appears in FIG. 4.

The angular misalignment sensor comprises a beamsplitter 15 that may be implemented as a semi-transparent plate or as a beam-splitting cube. The beamsplitter 15 is installed between the communication system transceive elements which should be optically matched relative to each other (i.e., the sources and photo-detectors shall be matched with their optical systems and their optical systems should be aligned to a line of sight direction connecting such systems)—e.g., between the base terminal radiation source placed in the unit 5 and a photo-detector of the subscriber terminal 2.

In the paths of the optical radiation reflected from the beamsplitter, to one side a retroreflector 16 is placed, and to the other side, a focussing device 17 is installed. In the focal area of the focussing device a light intensity transverse distribution sensor 18 is placed, which is implemented as a multi-element photo-detector, e.g. a CCD matrix. In case of the misalignment sensor installed at the base terminal unit 5, optical beam emitted by the source is reflected by the beamsplitter towards the retroreflector and then reverted at 180° towards the sensor 18. Optical radiation (the sunlight, for example) scattered by the subscriber terminal receive objective, is reflected by the beamsplitter 15 towards the same sensor 18. The sensor 18 is connected to a monitor that allows operator to observe the image of the subscriber terminal receive objective created by the focussing device 17 and intensity distribution in the angular diagram of the optical beam output from the unit 5. Coincidence of the image and a center of the angular directivity diagram means that the beam is precisely targeted at the receive aperture.

Figure 8:
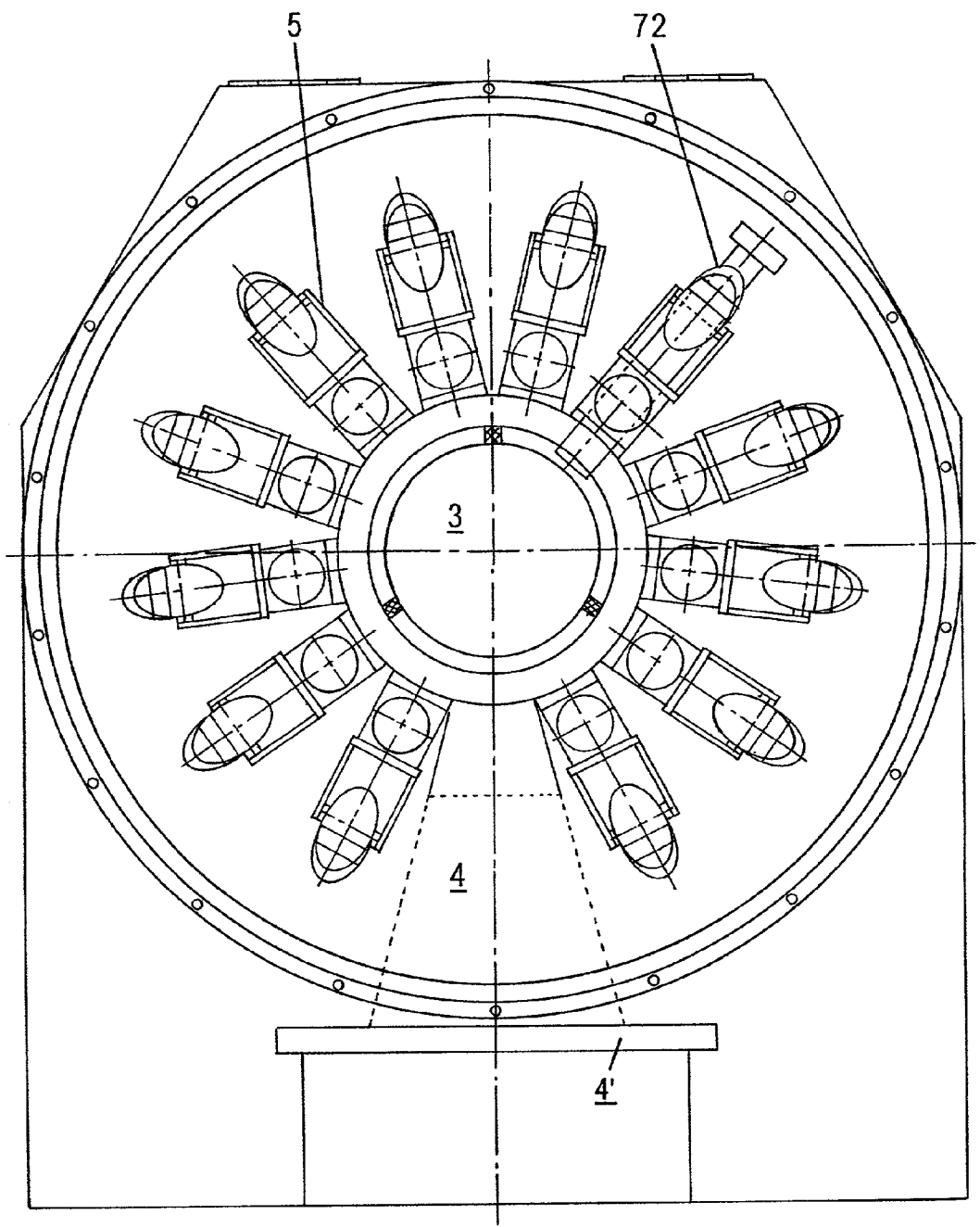

The angular misalignment sensor may be thereby implemented as a stationary one or as a portable one. The last option will be possibly less expensive, because the same device may be used for several communication systems adjustment, monitoring and elimination of misalignments during their operation. In this case, corresponding installation sockets will be provided at the systems' terminals. In FIG. 8 an angular misalignment sensor 72 is shown installed in one of the base terminal transmit units 5. The one misalignment sensor may be subsequently installed in different beam shaping devices for alignment of their elements to corresponding to them elements of the subscriber terminals. Alternatively, there could be one misalignment sensor for each transmit unit.

Provisioning of the optical communication system with a device sensing and measuring the angular misalignment between line-of-sight directions and relevant optical axes allows for a precise pointing of the information carrying beams at the corresponding photo-detectors. As a result, an increase is achieved in the communication reliability, availability and distance.

The optical communication system exhibited in FIGS. 1A and 1B operates in the following way.

Before the optical communication system begins, adjustment is made of the base terminal 1 transmit/receive devices relative to the subscriber terminals' 2 receive and transmit apertures, and of each subscriber terminal 2 optical channels relative to the base terminal 1 receive and transmit optical apertures.

As an example, let us consider how the adjustment is made of base terminal beam shaping device output beam and the subscriber terminal receive aperture for which such beam is intended. The angular misalignment sensor 72 (see FIG. 7) should be placed at the base terminal so that the beamsplitter 15 was incorporated into the light propagation path from the radiation source through the optical beam shaping device 5 to the receive optical system of the subscriber terminal 2. The angular misalignment sensor should be oriented so that optical image of the subscriber terminal 2 receive optical system was built by the focussing device 17 at the light intensity transverse distribution sensor 18, thus allowing to observe this image. Part of the beam from the device 5 radiation source is branched off by the beamsplitter 15 onto the retroreflector 16 (e.g. a cube corner prism) which turns the beam by 180° and directs it to the focussing device 17. This device builds an image of the light beam Fresnel zone on the sensor 18.

The elements of the optical beam shaping device in unit 5 (adjustment wedges 14, etc.) and also mirror 71 (see FIG. 7, where the output beam from the beam shaping device is reflected from a fixed mirror 78 and a tilting mirror 71 providing coarse targeting of the output beam at an intended subscriber terminal receive aperture) should be oriented and/or the radiation source should be positioned relative to the beam shaping device so that the beam Fresnel zone's image on the sensor 18 coincided with the image of the subscriber terminal 2 receiving optical system. The same procedure shall be repeated for all base terminal's beam shaping devices and corresponding subscriber terminals' receive apertures.

For adjustment of the base terminal receive system and corresponding subscriber terminal beam shaping device, the angular misalignment sensor should be installed so that the beamsplitter was placed at the base terminal between the optical beam shaping device of the subscriber terminal 2 and the objective 3 center of the base terminal 1, and by transverse displacement of the photo-receiver (photo-detector 8 or entry end of the optical fiber 9, if the latter is used) a superposition is achieved of the photo-receiver image on the sensor 18 with an image of the optical beam shaping device output aperture of the subscriber terminal 2 corresponding to it. The same procedure shall be repeated for all subscriber terminal photo-receivers and respective subscriber terminals' beam shaping devices' transmit apertures.

In the system implemented by the authors of the present application (see FIG. 7 and FIG. 8) optical fibers 9 were used to deliver optical radiation to the photo-detectors. The transverse displacement of the fibers' entry cross-sections was performed to achieve their coincidence with lens 3 focal points corresponding to the input beams intended for the fibers.

To perform such displacement the fibers were plugged into mounts 73 fastened into a metal holder 74 having spherical form concentric with a surface of the ball lens 3. The mounts 73 were implemented as metal balls inserted into sockets in the holder 74 having hemispherical bottoms. The balls being fastened to the sockets' bottoms by springs fixing their position, however allowing for manual rotation of each mount 73 using a handle. By rotating each of the balls, it was possible to perform a transverse displacement of each fiber's entry end and achieve coincidence of the fiber's cross section in the vicinity of a focal surface 75 of the lens 3 with the point where the input optical beam intended for this fiber was focused by the lens 3.

The adjustment at the subscriber terminal is made in the same manner: matching should be achieved between optical beam output from the beam shaping device of this terminal and the receiving device aperture of the base terminal, as well as between the photo-receiver of the subscriber terminal and the beam shaping device aperture of the base terminal.

Fulfillment of the above adjustments with the beam shaping devices and the receiving devices at the base terminal as well as at the subscriber terminals provides for overlapping of the receive apertures with centers of corresponding optical beams' cross sections and for mutual alignment of optical beams' radiation pattern axes with instantaneous fields of view of the photo-receivers for which the beams are intended.

The radiation from the base terminal 1 source 10, modulated by the information signal by means of known modulation devices (not shown in the Figs.), subsequently passes the beam shaping telescope 11, the optical filter 12, the attenuator 13 and the adjustment wedges 14, and then through the free space path reaches the subscriber terminal 2 with a receiving device implemented in a known manner, where the radiation is demodulated and the information is recovered.

Figure 7:
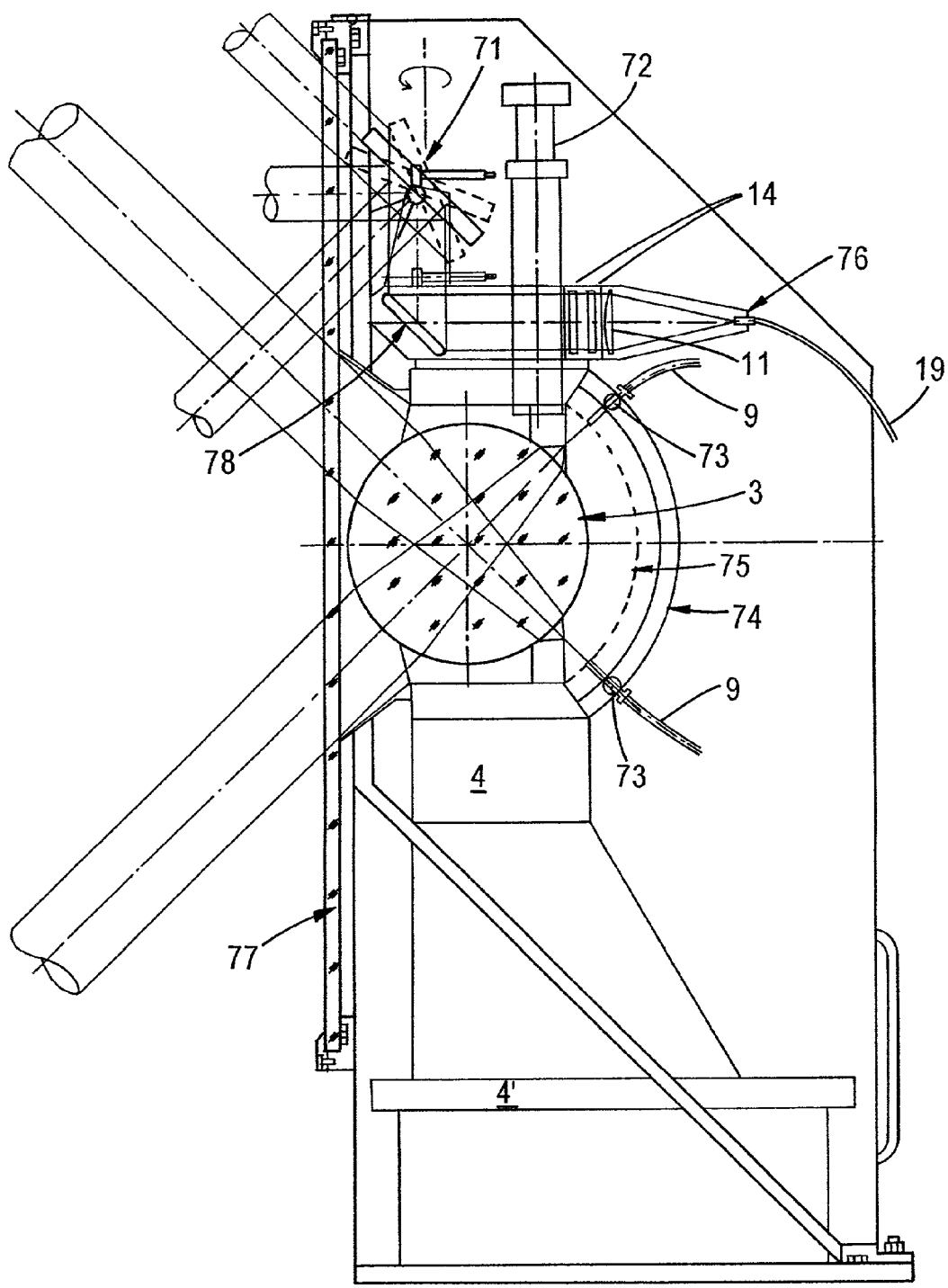
FIG. 7 and FIG. 8 are side and front views of the base terminal implemented and tested by the authors of the present application.

In the system implemented by the authors of the present application, the sources were installed in a unit separate from the optical-mechanical device shown on FIG. 7 and FIG. 8. Optical radiation was delivered to the optical-mechanical device via multimode optical fibers 19 inserted into mounts 76. The optical-mechanical device shown in FIG. 7 and FIG. 8 was designed for placement outside the building into a box with a transparent window 77 protecting the device from humidity and dust. All electronic equipment was placed into a separate, indoor, unit that did not require high level of protection, as it was located inside a building.

The transmission from the subscriber terminal to the base terminal receiving device is made in a similar way. In certain cases, in the light paths from one terminal to another, optical amplifiers may be installed of a known design, with a corresponding set of optical elements providing the light beam passing through the amplifiers (not shown in the FIGS. as being commonly known).

The system compactness in combination with the wide angular field-of-view of the base terminal receiving device makes it possible that a single base terminal can simultaneously serve for a multitude (up to ~15–20) of subscribers with a high bit rate (more than 622 Mbps) provided for every subscriber without interference between the subscribers or information security loss.

Aberrations of the optics in the unit 5 for shaping and transmitting a beam and various optical non-uniformities in a free-space optical path to a remote terminal cause intensity distribution at the aperture of the remote receiving device to be highly non uniform and make it problematic to properly align the terminals to enable reception at sufficient power levels. A feature of the preferred embodiment involves use of a multimode fiber selected to have certain specific parameters, for use in delivering radiation from the source to a respective beam shaping device, so as to mitigate these adverse effects.

Figure 5:
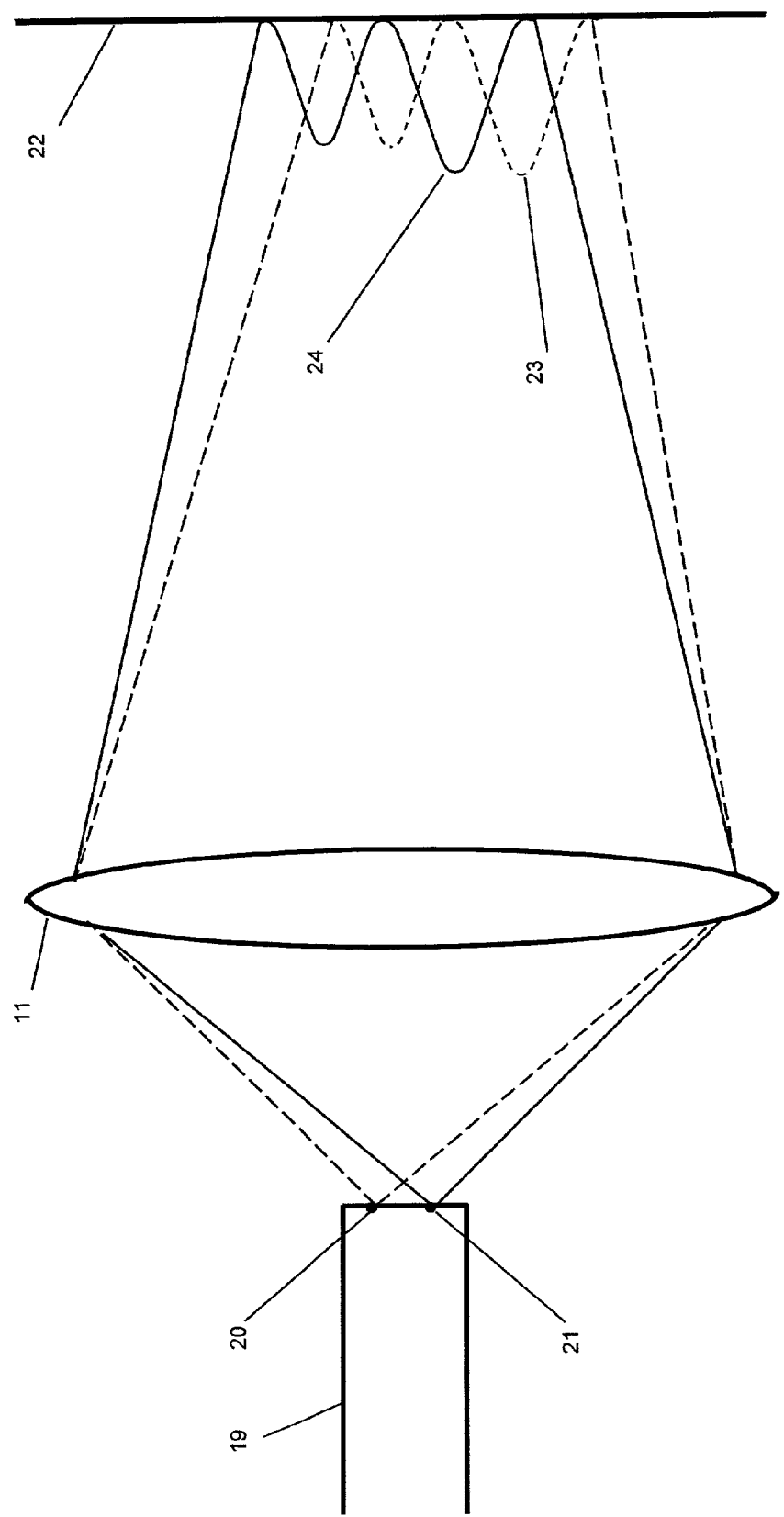
FIG. 5 is a side view of a simplified portion of the system useful in explaining the selection and use of a multimode fiber to deliver optical radiation to the beam shaping device.

FIG. 5 is useful in explaining this use of multimode fibers and the attendant selection of the fiber parameters. Such fibers may be used in the base terminal or the remote terminal(s) or both. Also, this technique has applications to other free-space optical communication systems, for example using somewhat different optics and/or in point-to-point type free-space optical communications systems. For convenience, FIG. 5 and the discussion thereof relates to an implementation of the fiber in a base terminal.

Provisioning of the sources and photo-detectors with optical fibers allows, for example, installation of the optical-mechanical and electronics systems of the base and/or subscriber terminals in separate units. The electronics unit may be placed indoors thus simplifying its protection against unfavorable effects of ambient conditions, while installation of the optical-mechanical unit outdoors allows to avoid losses of the light power in the windows and may provide wider angular field of view for the system. Maintenance of electronics as well as adding channels to service additional subscribers is simpler and cheaper in case a separate electronics unit placed inside the building. In some cases it may be advisable to co-locate the electronics unit with an ATM switch and/or other networking equipment connecting a free-space communication system to a metropolitan fiber optic network.

The use of a multimode optical fiber with properly selected parameters, to deliver optical radiation from the radiation source to the beam shaping device provides improvement of free-space optical link availability without increase in the radiation source's output power and/or a diameter of the receive aperture.

The basic reason for such improvement in availability is that properly selected multimode fiber provides mitigation of the beam transverse intensity non uniformity caused by: a) optical aberrations in the beam shaping device; b) optical non uniformity of windows through which the beam is transmitted into the atmosphere, and c) atmospheric optical inhomogeinity.

Theoretical calculations and experiments performed by the authors of the present application proved that mentioned in a), b) and c) optical aberrations and inhomogeinities in the beam path in many cases lead to the light radiation intensity non uniformity in the beam receive aperture plane with a contrast close to 100%.

Coincidence of the receive aperture of the base terminal receiving device or of the optical system concentrating the radiation at the subscriber terminal photo-detector with a local minimum in the non uniform intensity distribution leads to significant decrease in power of radiation incident at the base or subscriber terminal photo-detector.

A multimode fiber with properly selected parameters allows to average out large scale light intensity non uniformity in the receive aperture plane by way of coupling the fiber's entry end to the output of the radiation source and placing the fiber's exit cross-section in an area close to a focal surface of the beam shaping device.

The light intensity non uniformity caused by the aberrations and refraction index non-uniformity on the beam path is averaged out by the multimode fiber installation between the radiation source and the beam shaping device for the following basic reasons:

Any light emitting point in the fiber's exit cross-section is being reflected in the receive aperture plane by a point spread function (the PSF) with the light transverse distribution dependent on optical aberrations and the refraction index non uniformity on the path of the light from the fiber through the beam shaping device, windows (in case the device is placed inside a building), and/or other protecting optical surfaces, and the atmosphere, to the receive aperture plane.

The light transverse distributions created by different located in the fiber cross-section light emitting points are overlapped in the receive aperture plane with different shifts relative to each other determined by distances between such points. The shifts exceeding average scale of the non uniformity in the PSFs created by different light emitting points in the plane of the receive aperture cause coincidence of local maximums in some PSFs with local minimums in the other ones thus providing averaging of the maximums and minimums.

For efficient averaging of the transverse light distribution non uniformity in the receive aperture plane any PSF shall be narrower than total optical beam diameter in such plane. Otherwise the light distribution PSFs created by different light emitting points located in the exit cross-section of the fiber were not displaced sufficiently relative to each other in the receive aperture plane to provide overlapping of minimums and maximums in their intensity non uniformity.

Averaging of the transverse intensity non uniformity via overlapping of maximums and minimums may be understood from FIG. 5. As shown, a multimode fiber 19 has its exit cross-section placed in focal area of the beam shaping device's objective lens 11. The cross-section may be considered as a continuum of point sources emitting light. Two arbitrary light emitting points 20 and 21 in the fiber's cross-section, are shown for discussion purposes. The receive aperture plane is identified by the numeral 22, in the drawing. If the transmitting terminal is a base terminal, the receive aperture is that of a subscriber terminal, whereas, if the subscriber terminal is the transmitting terminal, the receive aperture is that of the base terminal objective lens 3. The drawing also shows cross-sections 23 and 24 of the light intensity distribution in the PSFs corresponding to points 20 (marked with a dashed line) and 21 (marked with a solid line). The distance between 20 and 21 is large enough for minimums and maximums in the PSFs to overlap and average out.

It may be seen from FIG. 5 that efficient averaging occurs, providing the following expression is satisfied:

$$d > f \cdot P / L,$$

where:
d—the fiber core diameter;
f—a focal length of the beam shaping device;
P—is a transverse size of a light distribution pattern (the PSF) created in the receive aperture plane by a light emitting point located within a cross-section of the fiber output end coupled to the beam shaping device;
L—a distance from the beam shaping device output lens to the receive aperture plane (L>>f, as is always the case in practical applications).

Satisfaction of the presented above expression means that an optical image of the fiber exit cross-section built by the beam shaping device's lens in the receive aperture plane is larger than the PSF transverse size. As the light intensity distribution in the receive aperture plane is described by the PSF convolution with the fiber cross-section's image, the distribution has low contrast of the non uniformity caused by the PSF non uniformity, if $d > f \cdot P / L$.

Assuming f=5 cm, P=30 cm and L=800 m we find that d shall be larger than 19 micrometers to meet the condition $d > f \cdot P / L$. Multimode optical fibers of such core diameter are commercially available.

Also it is important to take into account that any multimode fiber, while providing for averaging large scale non uniformity in the light distribution caused by the aberrations and refraction index inhomogeinity, also creates small scale transverse non uniformity of the light intensity at the fiber exit cross-section with large differences in intensity magnitude between them.

This intensity non uniformity is caused by interference between different modes of the fiber, and intensity maximums in such interference pattern are usually called "speckles" in optical literature. Speckles change their scale but do not vanish after the light passes through the beam shaping device, and the light beam also remains spatially non uniform along the whole propagation path, including at the receive aperture.

Speckles in the receive aperture plane may cause significant decrease in the receive beam power if the aperture occasionally coincides with a local optical field intensity minimum. This effect may be compensated by increase of the receive aperture diameter D till it exceeds characteristic speckle size $S_1$ in the receive aperture plane, or by decrease in the speckles size compared to D.

Characteristic speckle size S at a fiber output cross-section may be derived from the following expression: $S=\lambda/NA$, where $\lambda$ is a wavelength of the optical radiation propagating through the fiber; NA—the fiber numerical aperture. Correspondingly, if L>>f, which is always the case in typical practical applications, the speckles size in the receive aperture plane may be derived from the formula: $S_1=(\lambda/NA) \cdot (L/f)$. By substituting this expression into the inequality $D>S_1$, providing for the speckles averaging by the receive aperture, we find the following requirement:

$$NA > \lambda \cdot L / (D \cdot f).$$

Assuming that L=800 m, f=5 cm, $\lambda$=0.8 micrometers and D=10 cm this requirement is satisfied, providing NA exceeds 0.13. Multimode fibers with numerical apertures exceeding 0.13 are commercially available.

In the previous calculation it was presumed that numerical apertures of the fiber and of the beam shaping device's objective were matched. Otherwise, if the fiber numerical aperture is wider than the one of the objective, the light will be partly missing the objective causing a decrease in power reaching the receive aperture. On the other hand, the fiber numerical aperture being narrower than that of the beam shaping device makes the beam diameter at the output of the beam shaping device narrower than the device's output pupil. In this case maintenance of the same output power of the beam as in the case when its diameter equals the pupil's one may cause excess of the light intensity in the beam cross section over the limit imposed by the eye safety standards. Also, the narrower the output beam the more it is vulnerable to small scale obstacles appearing occasionally on its free-space path close to the beam shaping device (water droplets on the windows, etc.).

Numerical apertures of the receive optics (the base terminal wide-angle objective or the optical system concentrating the beam's radiation at the subscriber terminal photo-detector) and of the fiber delivering optical radiation from the receive optics to the photo-detector also shall be matched. If the fiber's numerical aperture narrower than that of the receive optics, part of the light rays (with angles of incidence on the fiber outside the fiber's numerical aperture) will not be confined within the fiber and not delivered to the photo-detector. On the other hand, if the fiber's numerical aperture is wider than that of the receive optics, stray light from different sources will be channeled to the photo-detector causing additional noise and decrease in the free-space optical channel availability and/or bit rate.

Another requirement to the fiber used to deliver optical radiation to the photo-detector is that the fiber's core diameter shall be larger than the receive optics' point spread function, as otherwise part of the optical radiation collected by such optics would be missing the core, causing loss of optical power delivered through the fiber to the photo-detector.

The use of optical amplifiers in the light propagation path from the sources to the photo-detectors results in an increase of the receive signal power, and thus in a better quality of communications. Implementation of the amplifiers as active optical fibers allows optimizing the use of energy stored in the active medium of the amplifiers.

Provisioning of the subscriber and/or base terminal with a local vertical direction sensor allows to reveal the corresponding terminal tilts caused, for example, by non uniform heating of supports on which the terminal is fastened, as well as by wind pressure force applied to these supports. For example, even if the terminal is placed indoors and most of the unfavorable factors have no direct effect on it, the terminal tilt relative to the local vertical direction caused by deformations of the building as a whole may reach one milliradian and even more.

The stabilizing device responding to the sensor output signal allows to compensate the tilts and thus avoid angular deviations of radiated beams, which at an operating distance of about 1 km may cause a linear transverse displacement of the beam up to several meters relative to the receiver aperture (the linear displacement may be approximated by multiplying the tilt measured in radians by an operating distance). In case of an outdoors installation of the terminal, the displacements may be much more, as the terminal's supports' instability is added to a building deformation. The stabilizing device allows eliminating such displacements, thus increasing the reliability and distance of communications.

As noted, the inventive use of carefully selected multimode fibers may be used in the base terminal 1 and/or in the subscriber terminals 2, in point to multi-point systems of the type shown in FIGS. 1A and 1B. Hence, to insure complete understanding, it may be helpful to review selection of appropriate fibers for the base terminal and then for one of the remote terminals.

In the base terminal 1, at least one radiation source is provided with a multimode optical fiber 19 with properly selected parameters delivering the optical radiation from the source to the beam shaping device, for example to the focussing optical element 11 shown in FIG. 5. The fiber 19 delivering the optical radiation from the source to the beam shaping device is selected from among multimode fibers with a core diameter d and numerical aperture NA satisfying the following expressions:

$$d > f \cdot P_T / L, \text{ and } NA > \lambda \cdot L / (D_T \cdot f),$$

where:
  f—is a focal length of the beam shaping device;
  $P_T$—is a transverse size of light distribution pattern created in the subscriber terminal receive aperture plane 22 by a light emitting point such as 20 or 21 located within a cross-section of the fiber output end coupled to the beam shaping device;
  L—is a distance from the beam shaping device output lens to the subscriber terminal receive aperture;
  The subscriber terminal receive aperture plane 22—is a plane perpendicular to a line connecting a center of the beam shaping device output lens and a center of a subscriber terminal receive aperture, with a center of the subscriber terminal receive aperture being located in this plane;
  The subscriber terminal receive aperture—is an aperture of an optical system concentrating at the subscriber terminal photo-detector optical radiation of the beam emitted by the base terminal beam shaping device;
  λ—is a wavelength of the optical radiation output from the fiber;
  $D_T$—is a diameter of the subscriber terminal receive aperture (pupil).

In the preferred system, the radiation sources at the subscriber terminals 2 are equipped with individual beam shaping devices having the same design as beam shaping devices at the base terminal. The devices in the subscriber terminals may be provided with optional additional components similar to those of the base terminals' beam shaping devices', such as optical filters and/or attenuators and/or optical wedges, and/or optical fibers delivering the optical radiation from the sources to the beam shaping devices. In such a case, the optical fibers in the subscriber terminals are multimode fibers selected to have characteristics satisfying similar criteria.

Specifically, the fiber delivering the optical radiation from the source to the beam shaping device in a remote subscriber terminal system is selected from among multimode fibers with a core diameter d and numerical aperture NA satisfying the following expressions:

$$d > f \cdot P_B / L, \text{ and } NA > \lambda \cdot L / (D_B \cdot f),$$

where:
  f—is a focal length of the beam shaping device;
  $P_B$—is a transverse size of light distribution pattern created in the base terminal receive aperture plane by a light emitting point located within a cross-section of the fiber output end coupled to the beam shaping device;
  L—is a distance from the beam shaping device output lens to the base terminal receive aperture plane;
  The base terminal receive aperture plane—is a plane perpendicular to a line connecting a center of the beam shaping device output lens and a center of a base terminal receive aperture, with a center of the base terminal receive aperture located in this plane;
  The base terminal receive aperture—is an aperture of the base terminal wide-angle objective;
  λ—is a wavelength of the optical radiation output from the fiber;
  $D_B$—is a diameter of the base terminal receive aperture (pupil).

Those skilled in the art will recognize that the inventive concepts discussed above are applicable to a wide range of variations as to their implementation and have a wide range of applications. For example, the concepts relating to stabilization, alignment and use of multimode fibers are applicable in both the base terminal and in the subscriber terminals, and such concepts are applicable in point-to-point free-space optical communication systems as well as in the point-to-multi-point free-space optical communication systems shown and described in detail above.

While the foregoing has described what are considered to be the best mode and/or other preferred embodiments, it is understood that various modifications may be made therein and that the inventions may be implemented in various forms and embodiments, and that it may be applied in numerous applications, only some of which have been described herein. It is intended by the following claims to claim any and all modifications and variations that fall within the true scope of the inventive concepts.

What is claimed is:

1. A free-space optical communication system comprising:
  a plurality of remote transmit/receive subscriber terminals each comprising a source of modulated optical radiation and a photo-detector; and
  a base terminal, comprising:
    (a) a plurality of sources of modulated optical radiation and a corresponding plurality of associated beam shaping devices; and
    (b) a receiving system comprising a plurality of photo-detectors and a single lens wide-angle objective shared for coupling optical radiation from respective remote terminals to respective photo-detectors of the receiving system of the base terminal; wherein:
    the single lens wide-angle objective comprises a set of concentric spherical layers made of optical materials with different indices of refraction, such that a spherical focal surface of the lens has a radius of curvature $R_f > R_0$ where $R_f$ is the radius of curvature of the lens focal surface; and $R_0$ is the radius of curvature of the lens external surface, and the single lens wide-angle objective is coupled only to the respective photo-detectors of the receiving system of the base terminal, and each optical beam shaping device has no common optical element with the objective lens and with others of the beam shaping devices at the base terminal.

2. A communication system as in claim 1, wherein each beam shaping device comprises at least one focusing element.

3. A communication system as in claim 2, wherein at least one beam shaping device further comprises at least two optical wedges made of an optical material transparent to a beam, placed in a propagation path of the beam so that each wedge can be rotated around the beam axis.

4. A communication system as in claim 2, wherein at least one beam shaping device further comprises an optical filter or an optical attenuator placed in a propagation path of a beam and implemented so that a stepwise or smooth variation of transparency is possible.

5. A communication system as in claim 2, wherein each focusing element comprises a telescope.

6. A communication system as in claim 1, wherein one respective photo-detector of the receiving system is provided with an optical fiber through which the radiation collected by the single wide-angle objective lens is delivered to the one respective photo-detector.

7. A communication system as in claim 1, further comprising optical amplifiers installed between respective radiation sources and optically coupled photo-detectors.

8. A free-space optical communication system comprising:
- a plurality of remote transmit/receive subscriber terminals each comprising a source of modulated optical radiation and a photo-detector; and
- a base terminal, comprising:
  - (a) a plurality of sources of modulated optical radiation and a corresponding plurality of associated beam shaping devices, each beam shaping device comprising a focusing element; and
  - (b) a receiving system comprising a plurality of photo-detectors and a single lens wide-angle objective shared for coupling optical radiation from respective remote terminals to respective photo-detectors of the receiving system of the base terminal; wherein:
- the single lens wide-angle objective is coupled only to the respective photo-detectors of the receiving system of the base terminal, and each optical beam shaping device has no common optical element with the objective lens and with others of the beam shaping devices at the base terminal, and
- each beam shaping device focusing element comprises a telescope comprising an objective lens and at least one lens installed between the objective lens and the corresponding source of modulated optical radiation, the telescope lenses being implemented so that the telescope lenses may be moved along all three coordinates relative to the radiation source and relative to each other.

9. A free-space optical communication system comprising:
- a plurality of remote transmit/receive subscriber terminals each comprising a source of modulated optical radiation and a photo-detector; and
- a base terminal, comprising:
  - (a) a plurality of sources of modulated optical radiation and a corresponding plurality of associated beam shaping devices; and
  - (b) a receiving system comprising a plurality of photo-detectors and a single lens wide-angle objective shared for coupling optical radiation from respective remote terminals to respective photo-detectors of the receiving system of the base terminal; wherein:
- the single lens wide-angle objective is coupled only to the respective photo-detectors of the receiving system of the base terminal, and each optical beam shaping device has no common optical element with the objective lens and with others of the beam shaping devices at the base terminal, and
- one of the radiation sources in the base terminal is provided with an optical fiber for delivering modulated optical radiation from the one source to a respective one of the beam shaping devices intended to transmit to a respective subscriber terminal.

10. A communication system as in claim 9, wherein the fiber is a multimode fiber with a core diameter d and numerical aperture NA satisfying the following expressions:

$d > f \cdot P/L$, and $NA > \lambda \cdot L/(D \cdot f)$, where:
- f—is a focal length of the respective beam shaping device;
- P—is a transverse size of a light distribution pattern created in a receive aperture plane of the respective subscriber terminal by a light emitting point located within a cross-section of the fiber output end coupled to the respective beam shaping device;
- L—is a distance from an output lens of the respective beam shaping device to a receive aperture of the respective subscriber terminal;
- λ—is a wavelength of the optical radiation output from the fiber; and
- D—is a diameter of the receive aperture of the respective subscriber terminal.

11. A communication system as in claim 10, wherein at least one optical fiber is implemented as an active fiber (fiberoptic amplifier).

12. A communication system as in claim 9, wherein at least one optical fiber is implemented as an active fiber (fiberoptic amplifier).

13. A free-space optical communication system comprising:
- a plurality of remote transmit/receive subscriber terminals each comprising a source of modulated optical radiation and a photo-detector; and
- a base terminal, comprising:
  - (a) a plurality of sources of modulated optical radiation and a corresponding plurality of associated beam shaping devices;
  - (b) a receiving system comprising a plurality of photo-detectors and a single lens wide-angle objective shared for coupling optical radiation from respective remote terminals to respective photo-detectors of the receiving system of the base terminal; and
  - a local vertical direction sensor and a device for stabilizing optical field of view of the receiving system and the field of view of at least one beam shaping device relative to the sensed direction;

wherein the single lens wide-angle objective is coupled only to the respective photo-detectors of the receiving system of the base terminal, and each optical beam shaping device has no common optical element with the objective lens and with others of the beam shaping devices at the base terminal.

14. A communication system as in claim 13, wherein the subscriber terminals further comprise beam shaping devices coupled to the sources in the subscriber terminals.

15. A communication system as in claim 14, wherein each beam shaping device in a subscriber terminal comprises at least one focusing element.

16. A communication system as in claim 15, wherein each focusing element comprises a telescope.

17. A communication system as in claim 15, wherein each beam shaping device focusing element and the corresponding source are implemented so that they can be moved relative to each other.

18. A communication system as in claim 15, wherein at least one beam shaping device in a subscriber terminal further comprises at least two optical wedges made of an optical material transparent to a beam, placed in a propagation path of the beam so that each wedge can be rotated around the beam axis.

19. A communication system as in claim 15, wherein at least one beam shaping device further comprises an optical filter or an optical attenuator placed in a beam propagation path and implemented so that a stepwise or smooth variation of transparency is possible.

20. A free-space optical communication system comprising:
a plurality of remote transmit/receive subscriber terminals each comprising a source of modulated optical radiation, a beam shaping device coupled to the source and a photo-detector; and
a base terminal, comprising:
(a) a plurality of sources of modulated optical radiation and a corresponding plurality of associated beam shaping devices; and
(b) a receiving system comprising a plurality of photo-detectors and a single lens wide-angle objective shared for coupling optical radiation from respective remote terminals to respective photo-detectors of the receiving system of the base terminal; wherein:
the single lens wide-angle objective is coupled only to the respective photo-detectors of the receiving system of the base terminal, and each optical beam shaping device has no common optical element with the objective lens and with others of the beam shaping devices at the base terminal, and
one of the radiation sources in one of the subscriber terminals has an optical fiber for delivering modulated optical radiation from the one source to the beam shaping device in the one subscriber terminal.

21. A communication system as in claim 20, wherein the fiber is a multimode fiber with a core diameter d and numerical aperture NA satisfying the following expressions $$d > f \cdot P/L, \text{ and } NA > \lambda \cdot L/(D \cdot f),$$

where:
f—is a focal length of the beam shaping device in the one subscriber terminal;
P—is a transverse size of light distribution pattern created in a receive aperture plane of the base terminal by a light emitting point located within a cross-section of the fiber output end coupled to the beam shaping device in the one subscriber terminal;
L—is a distance from an output lens of the beam shaping device to the base terminal receive aperture plane;
$\lambda$—is a wavelength of the optical radiation output from the fiber; and
D—is a diameter of the base terminal receive aperture.

22. A free-space optical communication system comprising:
a plurality of remote transmit/receive subscriber terminals each comprising a source of modulated optical radiation and a photo-detector; and
a base terminal, comprising:
(a) a plurality of sources of modulated optical radiation and a corresponding plurality of associated beam shaping devices; and
(b) a receiving system comprising a plurality of photo-detectors and a single lens wide-angle objective shared for coupling optical radiation from respective remote terminals to respective photo-detectors of the receiving system of the base terminal; wherein:
the single lens wide-angle objective is coupled only to the respective photo-detectors of the receiving system of the base terminal, and each optical beam shaping device has no common optical element with the objective lens and with others of the beam shaping devices at the base terminal, and
one subscriber terminal further comprises:
an optical system concentrating optical radiation at the photo-detector of the one subscriber terminal;
a beam shaping device;
a local vertical direction sensor; and
a device for stabilizing the field of view of the optical system concentrating optical radiation at the photo-detector of said one subscriber terminal and the field of view of the beam shaping device of said one subscriber terminal relative to this sensed direction.

23. A communication system as in claim 22, wherein the base terminal receiving system further comprises a sensor of angular misalignment between a base terminal receiving system line-of-sight direction at one of the subscriber terminals and a center of the receiving system instantaneous field of view corresponding to the base terminal photo-detector intended for reception of an optical beam emitted by the one subscriber terminal.

24. A communication system as in claim 22, wherein at least one of the base terminal beam shaping devices is provided with a sensor of angular misalignment between line-of-sight direction at an optical system concentrating a beam of radiation from the one shaping device radiation at an intended subscriber terminal's photo-detector, and the beam shaping device axis.

25. A communication system as in claim 22, wherein the one subscriber terminal further comprises a sensor of angular misalignment between the line-of-sight direction at a base terminal beam shaping device pointed at the one subscriber terminal, and a center of corresponding to the subscriber terminal photo-detector instantaneous field-of-view of the optical system concentrating the beam's radiation at such photo-detector.

26. A communication system as in claim 25, wherein the angular misalignment sensor comprises:
a beamsplitter installed in a path of the light propagation for splitting a beam into two paths;
a retroreflector installed in a path of the optical beam reflected to one side from the beamsplitter;

a focusing device is installed in a path of the optical beam to the other side of the beamsplitter; and a sensor of light intensity spatial distribution installed at a focal area of the focusing device.

27. A communication system as in claim 22, wherein the one subscriber terminal further comprises a beam shaping device and a sensor of angular misalignment between a line-of-sight direction targeted for the base terminal receiving system and an axis of the beam shaping device of the one subscriber terminal.

28. A communication system as in claim 27, wherein the angular misalignment sensor comprises:

a beamsplitter installed in a path of the light propagation for splitting a beam into two paths;

a retroreflector installed in a path of the optical beam reflected to one side from the beamsplitter;

a focusing device is installed in a path of the optical beam to the other side of the beamsplitter; and a sensor of light intensity spatial distribution installed at a focal area of the focusing device.

29. A free-space optical communication system comprising:

a plurality of remote transmit/receive subscriber terminals each comprising a source of modulated optical radiation and a photo-detector; and a base terminal, comprising:

(a) a plurality of sources of modulated optical radiation and a corresponding plurality of associated beam shaping devices; and (b) a receiving system comprising a plurality of photo-detectors and a single lens wide-angle objective shared for coupling optical radiation from respective remote terminals to respective photo-detectors of the receiving system of the base terminal; wherein:

the single lens wide-angle objective is coupled only to the respective photo-detectors of the receiving system of the base terminal, and each optical beam shaping device has no common optical element with the objective lens and with others of the beam shaping devices at the base terminal, the base terminal receiving system further comprises a sensor of angular misalignment between a base terminal receiving system line-of-sight direction at one of the subscriber terminals and a center of the receiving system instantaneous field of view corresponding to the base terminal photo-detector intended for reception of an optical beam emitted by the one subscriber terminal, and the angular misalignment sensor comprises:

a beamsplitter installed in a path of the light propagation for splitting a beam into two paths;

a retroreflector installed in a path of the optical beam reflected to one side from the beamsplitter;

a focusing device installed in a path of the optical beam to the other side of the beamsplitter; and a sensor of light intensity spatial distribution installed at a focal area of the focusing device.

30. A free-space optical communication system comprising:

a plurality of remote transmit/receive subscriber terminals each comprising a source of modulated optical radiation and a photo-detector; and a base terminal, comprising:

(a) a plurality of sources of modulated optical radiation and a corresponding plurality of associated beam shaping devices; and (b) a receiving system comprising a plurality of photo-detectors and a single lens wide-angle objective shared for coupling optical radiation from respective remote terminals to respective photo-detectors of the receiving system of the base terminal; wherein:

the single lens wide-angle objective is coupled only to the respective photo-detectors of the receiving system of the base terminal, and each optical beam shaping device has no common optical element with the objective lens and with others of the beam shaping devices at the base terminal, at least one of the base terminal beam shaping devices is provided with a sensor of angular misalignment between line-of-sight direction at an optical system concentrating a beam of radiation from the one shaping device radiation at an intended subscriber terminal's photo-detector, and the beam shaping device axis, and the angular misalignment sensor comprises:

a beamsplitter installed in a path of the light propagation for splitting a beam into two paths;

a retroreflector installed in a path of the optical beam reflected to one side from the beamsplitter;

a focusing device is installed in a path of the optical beam to the other side of the beamsplitter; and a sensor of light intensity spatial distribution installed at a focal area of the focusing device.

* * * * *